(12) United States Patent  
Jansen

(10) Patent No.: US 7,781,932 B2  
(45) Date of Patent: Aug. 24, 2010

(54) PERMANENT MAGNET ASSEMBLY AND METHOD OF MANUFACTURING SAME

(75) Inventor: Patrick Lee Jansen, Scotia, NY (US)

(73) Assignee: General Electric Company, Schenectady, NY (US)

( * ) Notice: Subject to any disclaimer, the term of this patent is extended or adjusted under 35 U.S.C. 154(b) by 184 days.

(21) Appl. No.: 11/967,747

(22) Filed: Dec. 31, 2007

(65) Prior Publication Data

US 2009/0167103 A1 Jul. 2, 2009

(51) Int. Cl.  
*H02K 21/12* (2006.01)

(52) U.S. Cl. .................................. 310/156.08

(58) Field of Classification Search ............ 310/156.21, 310/156.28, 156.01, 156.08, 156.09  
See application file for complete search history.

(56) References Cited

U.S. PATENT DOCUMENTS

| | | | |
|---|---|---|---|
| 4,137,884 A * | 2/1979 | Odazima et al. ......... | 123/149 D |
| 4,633,113 A * | 12/1986 | Patel ..................... | 310/156.28 |
| 4,792,712 A | 12/1988 | Stokes | |
| 4,910,861 A * | 3/1990 | Dohogne ................ | 29/598 |
| 5,015,307 A | 5/1991 | Shimotomai et al. | |
| 5,447,578 A | 9/1995 | Ozaki et al. | |
| 6,452,301 B1 * | 9/2002 | Van Dine et al. ....... | 310/156.12 |
| 6,878,217 B2 | 4/2005 | Kikugawa et al. | |
| 6,884,513 B2 | 4/2005 | Kikugawa et al. | |
| 6,969,937 B1 | 11/2005 | Schuering | |
| 7,030,530 B2 * | 4/2006 | Malmberg ............ | 310/156.28 |
| 7,053,743 B2 | 5/2006 | Laskaris et al. | |
| 7,098,569 B2 | 8/2006 | Ong et al. | |
| 7,148,777 B2 | 12/2006 | Chell et al. | |
| 7,573,168 B2 | 8/2009 | Carl, Jr. et al. | |
| 2004/0216811 A1 | 11/2004 | Ikegami | |
| 2005/0008838 A1 | 1/2005 | Ohshima et al. | |
| 2005/0233068 A1 | 10/2005 | Yoshimura et al. | |
| 2007/0160863 A1 | 7/2007 | Hamada et al. | |

FOREIGN PATENT DOCUMENTS

| | | |
|---|---|---|
| DE | 102004042927 A1 | 3/2006 |
| DE | 102005040389 A1 | 3/2007 |
| EP | 1990811 | 11/2008 |

OTHER PUBLICATIONS

European Search Report for 08171650.8-2207, dated May 11, 2009, 6 pages.

* cited by examiner

*Primary Examiner*—Nguyen N Hanh  
(74) *Attorney, Agent, or Firm*—James McGinness, Esq.; Armstrong Teasdale LLP

(57) ABSTRACT

A permanent magnet rotor assembly includes a rotor and a plurality of permanent magnet pole assemblies positioned against the rotor. Each of the permanent magnet pole assemblies includes a magnetic block and an encapsulating member that substantially encapsulates the magnetic block.

11 Claims, 3 Drawing Sheets

PERMANENT MAGNET ASSEMBLY AND METHOD OF MANUFACTURING SAME

BACKGROUND OF THE INVENTION

The field of the invention relates generally to permanent magnet assemblies for use in electric machines, and more particularly, to permanent magnet assemblies that include an encapsulating member and methods of manufacturing the same.

Some known electric machines, e.g., those used with electric utility class wind generators and other applications, include large diameter rotors (i.e., a diameter of two feet or greater). One example of such an electric machine is a 2-10 megawatt, medium speed (e.g., 100-400 rpm) permanent magnet generator for wind turbines. Large diameter rotors generally include a plurality of permanent magnet assemblies. At least some known permanent magnet assemblies are formed from multiple magnetic blocks that are secured to the rotor. However, known magnetic blocks, which are typically made from Neodymium Iron Boron (NdFeB), may not be adequately protected from the environment, and as such, such magnets may be vulnerable to corrosion. Corroded magnetic blocks tend to flake, crack, crumble, or otherwise degrade. As a result, corrosion of the magnetic blocks may significantly reduce the reliability and life of the electric machine.

In some known machines, the magnetic blocks are coated with a thin protective layer. For example, the magnetic blocks can be coated with approximately 10-30 micrometers of epoxy or nickel plating. Although such coatings generally facilitate preventing corrosion to the magnets, applying the thin protective layer to the magnetic blocks also adds significant costs to their production. Moreover, the layer may be easily damaged during handling of the magnetic blocks and more particularly, may be damaged during assembly of the electric machine (e.g., attaching the magnetic blocks to the rotor). The damaged portions of the layer leave the magnetic blocks susceptible to corrosion. Thus, the thin protective layers that are sometimes used, may be inadequate to protect the magnetic blocks from corrosion.

In small diameter machines (i.e., machines having a diameter less than two feet), a sealed metallic retaining can or ring is often used to secure the magnetic blocks in position, as well as to provide additional corrosion protection. In large diameter machines, retaining cans and rings are not feasible as the cans and rings may be easily damaged during their installation thereby making them difficult to install on large diameter machines. Within at least some small diameter machines, the magnetic blocks are secured directly to the rotor using fiberglass banding. However, such banding generally is not used with large diameter rotors because it takes a long time for the fiberglass to cure. In addition, the ovens that must be used to cure such a rotor are large and are expensive to construct and maintain. In addition, such ovens require large amount of energy. Moreover, the fiberglass does not prevent circumferential movement of the magnetic blocks with respect to the rotor.

Within at least some large diameter machines, the magnetic blocks are covered with plastic across all of their outwardly-facing surfaces. However, in such embodiments, the surface of the magnetic blocks adapted for face-to-face engagement with the rotor is left uncovered because the plastic may adversely effect the magnetic flux between the magnetic blocks and the rotor. As a result, the uncovered surface is vulnerable to corrosion.

BRIEF DESCRIPTION OF THE INVENTION

In one aspect, a permanent magnet rotor assembly is for use with an electric machine. The rotor assembly generally comprises a rotor and a plurality of permanent magnet pole assemblies positioned against the rotor. Each of the permanent magnet pole assemblies comprises a magnetic block and an encapsulating member that substantially encapsulates the magnetic block.

In another aspect, a permanent magnet pole assembly is for a permanent magnet rotor assembly including a rotor. The permanent magnet pole assembly generally comprises a plurality of magnetic blocks and an encapsulating element underlying the plurality of blocks such that when the permanent magnet pole assembly is positioned against the rotor, the encapsulating element is positioned between the plurality of magnetic blocks and the rotor.

In still another aspect, a method of manufacturing a permanent magnet pole assembly generally comprises providing a first encapsulating element, positioning at least one magnetic block within a portion of the first encapsulating element, and coupling a second encapsulating element to the first encapsulating element such that the first and second encapsulating elements cooperate to completely encapsulate the at least one magnetic block to facilitate protecting the at least one magnetic block from corrosion.

DETAILED DESCRIPTION OF THE INVENTION

Figure 1:
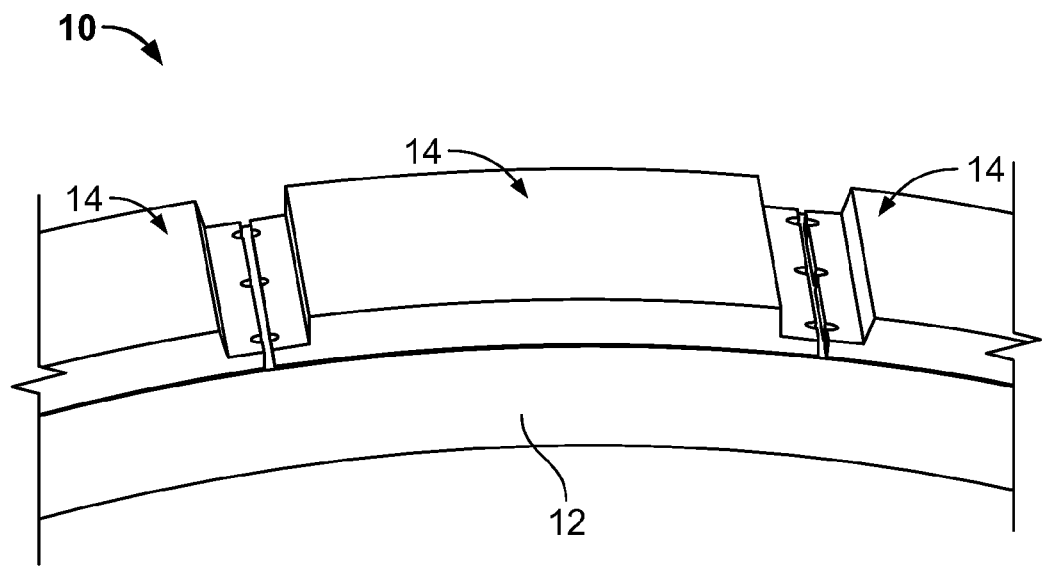
FIG. 1 is a perspective view of a portion of an exemplary permanent magnet rotor assembly including a rotor and a plurality of permanent magnet pole assemblies coupled thereto.

FIG. 1 is a perspective view of a portion of an exemplary permanent magnet rotor assembly for an electrical machine (not shown). In the exemplary embodiment, the assembly 10 includes a rotor 12 and a plurality of permanent magnet pole assemblies 14 that are each coupled to the rotor 12. In the exemplary embodiment, the permanent magnet pole assemblies 14 are each coupled to the rotor 12 using mechanical fasteners, such as bolts (not shown). Alternatively, the assemblies 14 can be coupled to the rotor using any other known coupling method, such as but not limited to bonding or clamping. Moreover, in the exemplary embodiment, the magnet rotor assemblies 14 are suitable for use with large diameter electric machines, such as, for example, high pole count electric machines that are useful for low/medium speed drives, such as direct-drive multi-megawatt wind generators. As defined herein a large diameter machine has a rotor with a diameter of approximately two feet or larger. It should be understood by one of ordinary skill in the art, however, that the magnet rotor assemblies 14 can be used with other types of electric machines without departing from the scope of this invention. For example, the permanent magnet pole assemblies 14 disclosed herein can be used in single and/or double-sided rotors, and both inner-rotor and outer-rotor topologies.

Figure 2:
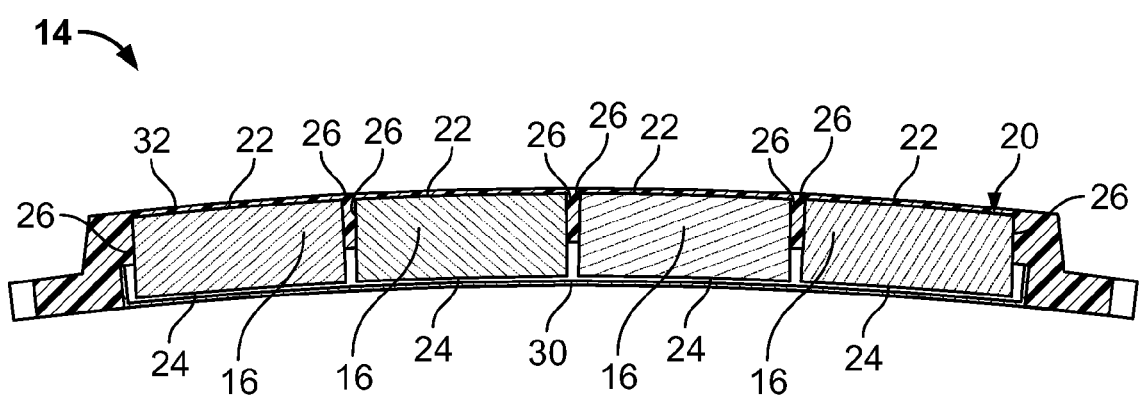
FIG. 2 is a cross sectional view of one of the permanent magnet pole assemblies shown in FIG. 1 and removed from the rotor, and including first and second encapsulating elements.

FIG. 2 is a cross sectional view of one of the permanent magnet pole assemblies 14 removed from the rotor 12. In the exemplary embodiment, each of the permanent magnetic pole assemblies 14 includes a plurality of magnetic blocks 16 and an encapsulating member 20 that substantially encapsulates each magnetic block 16 to facilitate preventing such blocks 16 from corroding. In one embodiment, the encapsulating member 20 completely encapsulates each of the magnetic blocks 16. Moreover, in the exemplary embodiment, each permanent magnetic pole assembly 14 includes four magnetic blocks 16. Alternatively, pole assembly 14 may include more or less than four magnetic blocks 16. In the exemplary embodiment, each magnetic block 16 includes a top 22, a bottom 24, two sides 26 and two opposite ends 28 (shown in FIG. 3). Moreover, in the exemplary embodiment, each top 22, bottom 24, side 26 and ends 28 of the magnetic blocks 16 is substantially planar. It is contemplated, however, that the magnetic blocks 16 can be fabricated with a bottom 24 that is contoured with a shape that substantially matches the contour of the outer surface of the rotor 12 (shown in FIG. 1). Alternatively, the number, size, and shape of the magnetic blocks 16 are variably selected, based on the size of the rotor 12 and the extent of electrical losses in the magnetic blocks 16. Moreover, as should be appreciated by one of ordinary skill in the art, magnetic blocks 16 can have any shape that enables assembly 14 to function as described herein. For example, smaller magnetic blocks generally have lower electrical losses per unit area (loss densities) than larger magnetic blocks.

In the exemplary embodiment, the encapsulating member 20 includes a first encapsulating element 30 and a second encapsulating element 32 that extends from the first encapsulating element 30. The first and second encapsulating elements 30 and 32, respectively, cooperative to form a protective cover that substantially encapsulates the magnetic blocks 16 and shields each magnetic block 16 from the environment to facilitate preventing or minimizing corrosion of the magnetic blocks 16. In the exemplary embodiment, the first encapsulating element 30 underlies the magnetic blocks 16 and the second encapsulating element 32 overlies the magnetic block 16. Alternatively, the first and second elements 30 and 32, respectively, could be oriented in any configuration that enables the encapsulating member 20 to function as described herein. Moreover, in alternative embodiments, the encapsulating member 20 includes more than two elements 30 and 32.

Figure 3:
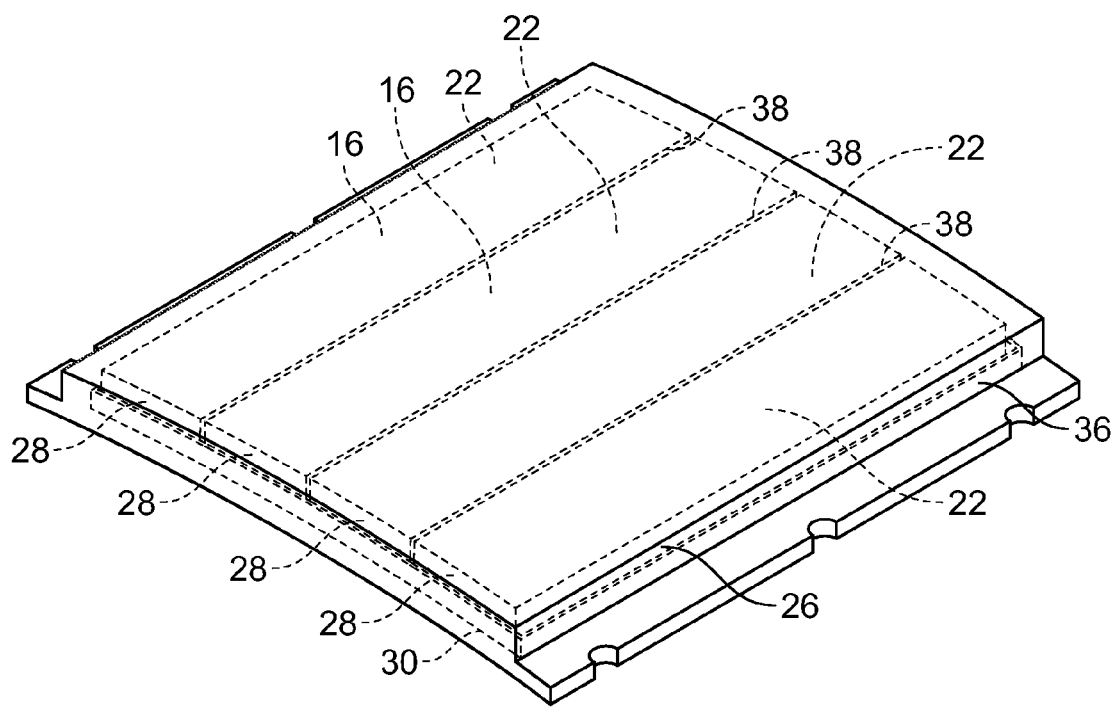
FIG. 3 is a perspective view of the permanent magnet pole assembly shown in FIG. 2 with the second encapsulating element semi-transparent.
Figure 4:
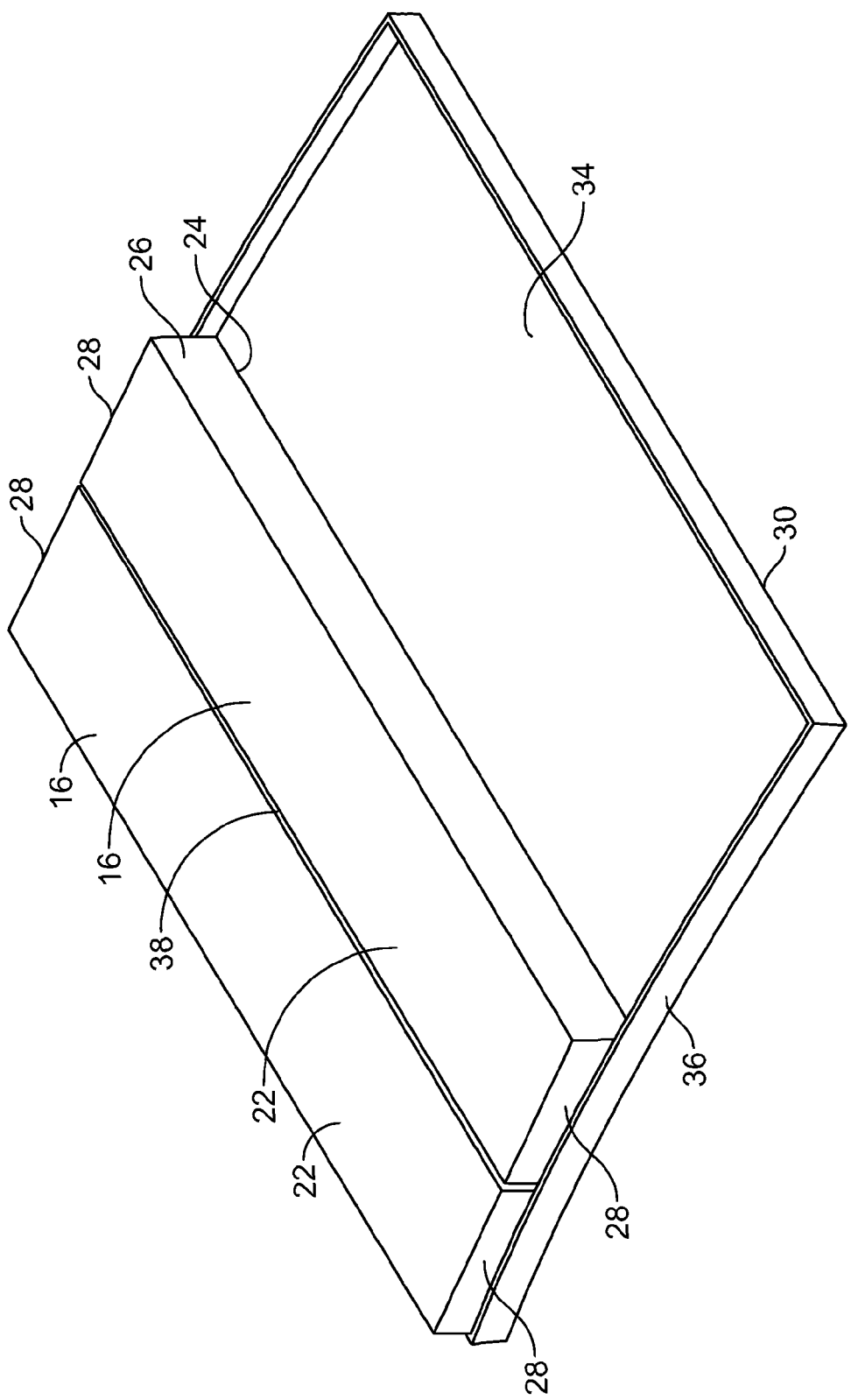
FIG. 4 is a perspective view of the permanent magnetic pole assembly shown in FIG. 2 and with the second encapsulating element and two magnetic blocks removed.

FIG. 3 is a perspective view of pole assembly 14 with the second encapsulating element 32 made semi-transparent. FIG. 4 is a perspective view of assembly 14 with element 32 and two magnetic blocks 16 each removed.

As shown in FIGS. 3 and 4, in the exemplary embodiment, the first encapsulating element 30 is a tray having a base 34 and a periphery flange 36 that extends upward from base 34. The tray is sized and shaped for receiving the magnetic blocks 16 in side-by-side relationship such that an optional gap 38 is defined between each pair of adjacent magnetic blocks 16. Specifically, the magnetic blocks 16 are positioned on the tray base 34 such that the bottom 24 of each of the magnetic blocks 16 is in a substantial face-to-face engagement against the tray. In the exemplary embodiment, the tray is size to receive four magnetic blocks 16 such that periphery flange 36 extends around the four blocks 16. As illustrated best in FIG. 1, in the exemplary embodiment, a lower surface of the base 34 of the tray is contoured to substantially conform to the contoured outer surface of the rotor 12 to which the permanent magnetic pole assembly 14 is mounted.

In the exemplary embodiment, the tray is fabricated from a metallic material and the first encapsulating element 30 has greater corrosion resistance than that of the magnetic blocks 16. In one embodiment, the first encapsulating element 30 is a ferromagnetic sheet steel. Alternatively, other types of metallic materials can be used to make first encapsulating element 30.

As shown in FIG. 2, in the exemplary embodiment, the second encapsulating element 32 is a fiber-reinforced polymer that extends from the first encapsulating element 30. More specifically, in the exemplary embodiment, the fiber-reinforced polymer is molded onto the first encapsulating element 30 and onto the magnetic blocks 16 such that the blocks 16 are encapsulated by element 30. More specifically, in the exemplary embodiment, the fiber-reinforced polymer covers the top 22, sides 26, and ends 28 of each of the magnetic blocks 16. As a result, element 30 substantially seals the gaps 38 defined between adjacent pairs of magnetic blocks 16. Alternatively, second encapsulating element 32 can be connected to or extend from element 30 in other ways besides being molded directly to the first encapsulating element 30 and magnetic blocks 16. A thickness of the fiber-reinforced polymer between adjacent magnetic blocks 16, and an airgap of the electric machine (not shown) is preferably as thin as is allowed by mechanical requirements to maximize the efficiency of the magnetic flux paths defined within pole assembly 14. Suitable polymers for use in the fiber-reinforced polymer of the second encapsulating element 32 include, but are not limited to only including, polyamide, polyurethane, polyester, vinyl, nylon, polycarbonate, and/or epoxy. The fiber-reinforced polymer may also be a laminate. In another embodiment, the second encapsulating element 32 is formed from a polymer and does not include fiber reinforcement.

Because the encapsulating member 20 completely encapsulates the magnetic blocks 16, the magnetic blocks 16 are substantially protected from environmental conditions that may cause corrosion. The improved corrosion protection facilitates increasing the reliability and useful life of the electric machine, and also enables less stringent enclosure requirements. For example, known wind turbine generators having large diameter rotors generally have enclosures ratings of IP54 as set forth by the International Electrotechnical Commission's (IEC)'s standard 60529. The enclosure rating is a rating of the degree of protection provided by such enclosures. Permanent magnetic pole assemblies 14 fabricated in accordance with the present invention, however, potentially enable an enclosure to be used that has less stringent requirements, such as an enclosure rating of IP23, without sacrificing any amount of protection, as such, such enclosures facilitate the use of a wind turbine generator that is less costly to manufacture, maintain and operate as compared to known wind turbine generators that use enclosures with a greater enclosure rating.

The permanent magnetic pole assemblies 14 can be manufactured by initially providing the first encapsulating element 30, and then positioning at least one of the magnetic blocks 16 within the first encapsulating element 30. The second encapsulating element 32 is then coupled to or extended from the first encapsulating element 30. As described above, the first and second encapsulating elements 30 and 32, respectively, cooperate to completely encapsulate the magnetic blocks 16 such that the magnetic blocks 16 are substantially shielded from environmental conditions that may cause corrosion. In the exemplary embodiments described herein, the magnetic blocks 16 are positioned within a generally, flat (or arc shaped) tray such that the blocks 16 are in side-by-side relationship with each other, and are in substantial face-to-face contact with the tray. The tray is contoured with a shape that substantially mirrors the contour of the outer surface of the rotor 12. In the exemplary embodiment, the second encapsulating element 32 extends from and is coupled to the first encapsulating element 30 through a molding process in which a fiber-reinforced polymer is extruded over each of the magnetic blocks 16 and over the first encapsulating element 30.

The encapsulating member 20 as described herein facilitates the prevention of magnetic blocks 16 from corrosion. More specifically, the encapsulating member 20, as described above, substantially encapsulates the magnetic blocks 16 and shields each magnetic block 16 from the environment.

The methods, apparatus, and systems are not limited to the specific embodiments described herein or to the specific illustrated encapsulating member.

While the invention has been described in terms of various specific embodiments, those skilled in the art will recognize that the invention can be practiced with modification within the spirit and scope of the claims.

What is claimed is:

1. A permanent magnet rotor assembly for use with an electric machine, said rotor assembly comprising:
   a rotor; and
   a plurality of permanent magnet pole assemblies positioned against said rotor, each of said permanent magnet pole assemblies comprises a magnetic block and an encapsulating member that substantially encapsulates said magnetic block, wherein said encapsulating member comprises a first encapsulating element and a second encapsulating element extending from said first encapsulating element, said first encapsulating element comprising a base and a peripheral flange that extends upward from said base.

2. A permanent magnet rotor assembly in accordance with claim 1 wherein said first encapsulating element is fabricated from a material that is different than a material used to fabricate said second encapsulating element.

3. A permanent magnet rotor assembly in accordance with claim 2 wherein said second encapsulating element is fabricated from at least one of polyamide, polyurethane, polyester, vinyl, nylon, polycarbonate, and epoxy.

4. A permanent magnet rotor assembly in accordance with claim 2 wherein said second encapsulating element comprises a reinforced plastic material.

5. A permanent magnet rotor assembly in accordance with claim 2 wherein said first encapsulating element comprises a metallic material.

6. A permanent magnet rotor assembly in accordance with claim 5 wherein said first encapsulating element comprises a ferromagnetic sheet of material.

7. A permanent magnet pole assembly for a permanent magnet rotor assembly including a rotor, said permanent magnet pole assembly comprising:
   a plurality of magnetic blocks; and
   an encapsulating element underlying said plurality of blocks such that when the permanent magnet pole assembly is positioned against the rotor, the encapsulating element is positioned between said plurality of magnetic blocks and the rotor, wherein the encapsulating element comprises a first encapsulating element and a second encapsulating element extending from said first encapsulating element, wherein said first encapsulating element comprises a base and a peripheral flange that extends upward from said base.

8. A permanent magnet pole assembly in accordance with claim 7 wherein said second encapsulating element comprises a plastic material and said first encapsulating element comprises a metallic material.

9. A permanent magnet pole assembly in accordance with claim 7 wherein said first encapsulating element comprises a ferromagnetic sheet.

10. A permanent magnet pole assembly in accordance with claim 7 wherein a portion of said base is contoured.

11. A permanent magnet pole assembly in accordance with claim 7 wherein said plurality of magnetic blocks comprises four magnetic blocks.

* * * * *